F. H. BUCKINGHAM.
SCALE.
APPLICATION FILED OCT. 21, 1911.

1,166,658.

Patented Jan. 4, 1916.
3 SHEETS—SHEET 1.

Witnesses
Albert A. Hofmann.
H. W. Krainbring.

Inventor
Fremont H. Buckingham.
By Edward N. Pagelsen,
Attorney

F. H. BUCKINGHAM.
SCALE.
APPLICATION FILED OCT. 21, 1911.

1,166,658.

Patented Jan. 4, 1916.
3 SHEETS—SHEET 2.

Witnesses
Albert A. Hofmann
H. W. Kreinbring

Inventor
Fremont H. Buckingham
By Edward N. Pagelsen,
Attorney

F. H. BUCKINGHAM.
SCALE.
APPLICATION FILED OCT. 21, 1911.
1,166,658.
Patented Jan. 4, 1916.
3 SHEETS—SHEET 3.
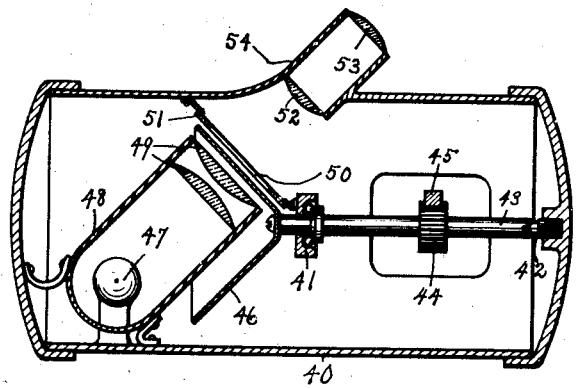
Fig. 6.
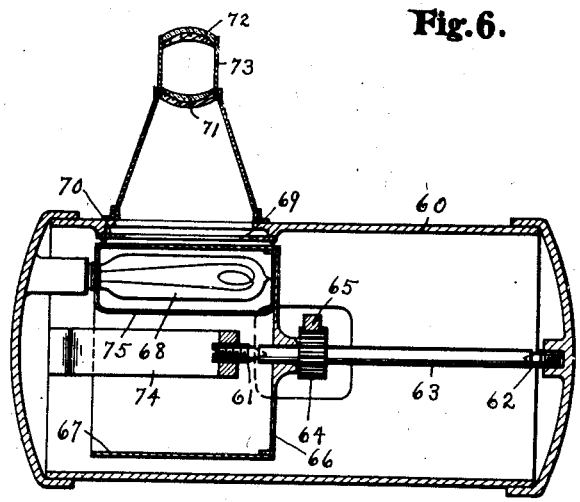
Fig. 7.
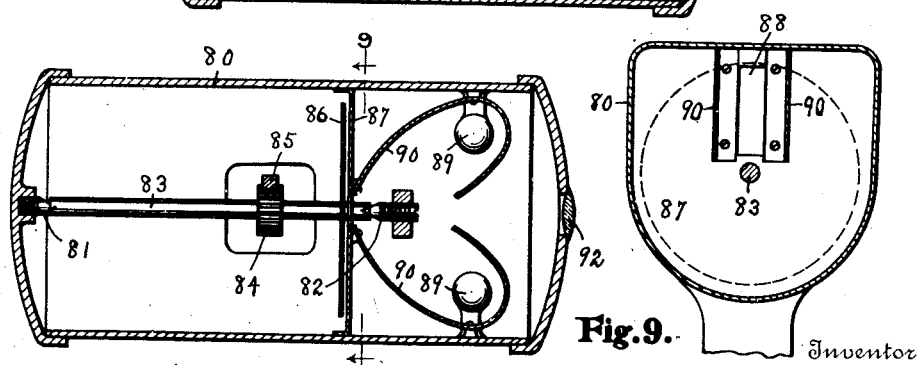
Fig. 8.
Fig. 9.
Witnesses
Albert A. Hofmann
H. W. Kreinbring
Inventor
Fremont H. Buckingham
By Edward N. Pagelsen,
Attorney

UNITED STATES PATENT OFFICE.

FREMONT H. BUCKINGHAM, OF DETROIT, MICHIGAN, ASSIGNOR TO STANDARD COMPUTING SCALE COMPANY, LIMITED, OF DETROIT, MICHIGAN.

SCALE.

1,166,658.      Specification of Letters Patent.      Patented Jan. 4, 1916.

Application filed October 21, 1911. Serial No. 655,879.

*To all whom it may concern:*

Be it known that I, FREMONT H. BUCKINGHAM, a citizen of the United States, residing at Detroit, in the county of Wayne and State of Michigan, have invented a new and useful Scale, of which the following is a specification.

This invention relates to scales adapted to indicate the value of the article placed upon the load-receiver, and its object is to provide a computing scale which shall be simple, delicate and accurate.

This invention consists in combination with the frame, platform, and lever mechanism of the scale, of a transparent revoluble disk upon which suitable numbers are printed, means for projecting a beam of light through this disk, a screen to receive this light, and means for operatively connecting this disk with the lever mechanism of the scale in such a manner that the disk will be revolved in proportion to the load on the platform.

Figure 1:
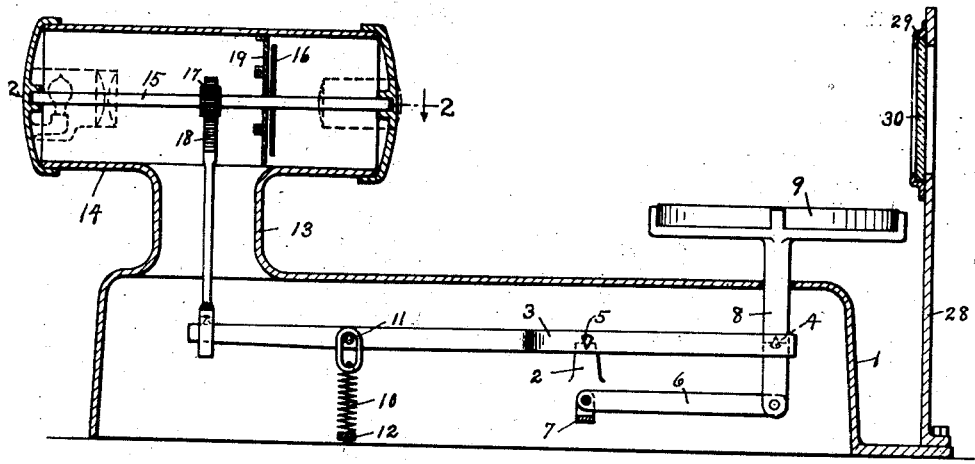
Figure 2:
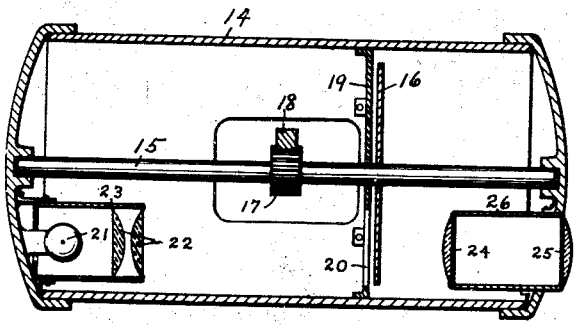
Figure 3:
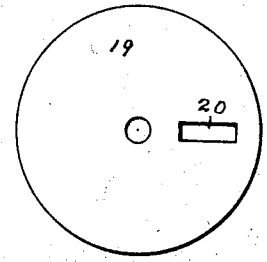
Figure 4:
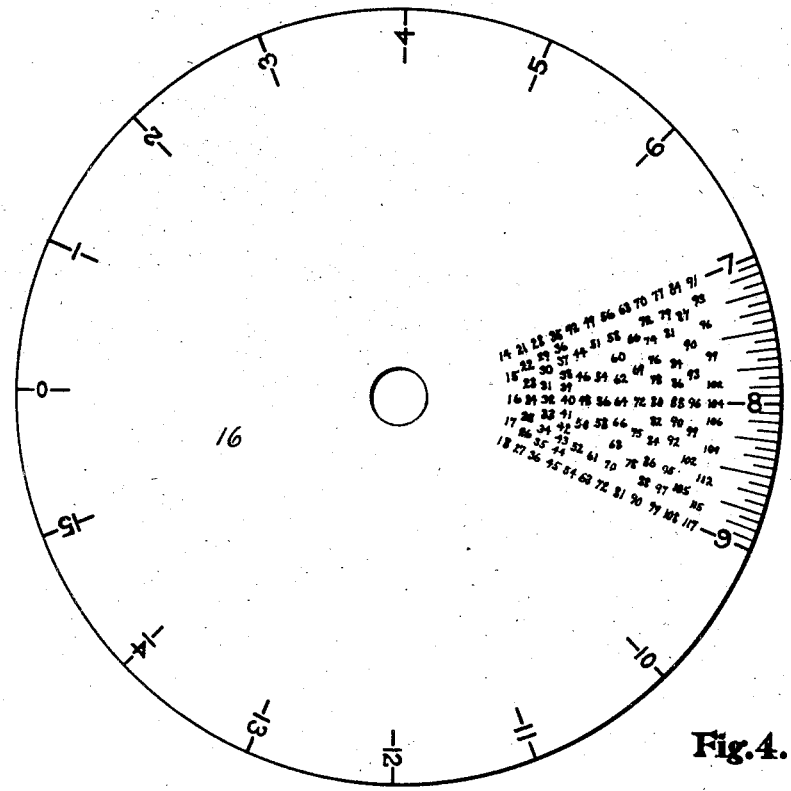
Figure 5:
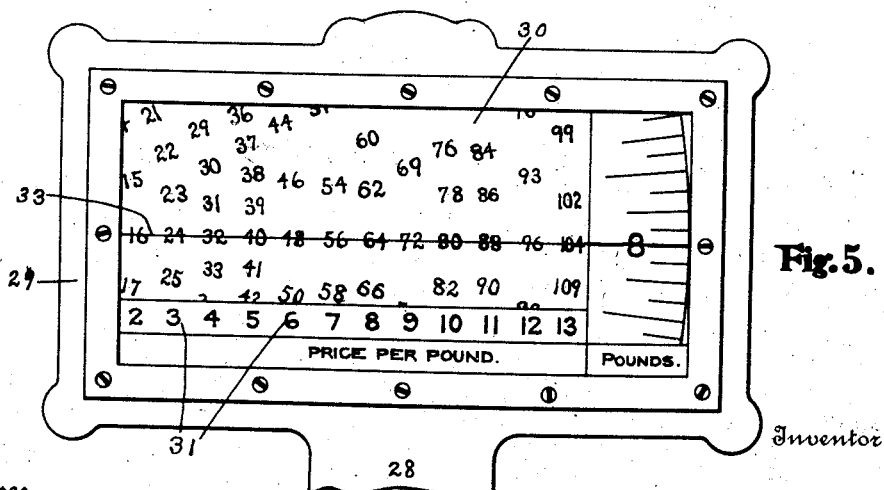

In the accompanying drawings Figure 1 is a vertical section of a scale embodying this invention. Fig. 2 is a horizontal section on the line 2—2 of Fig. 1. Fig. 3 is an elevation of the shutter. Fig. 4 is an enlarged elevation of the transparent disk showing some of the characters in position. Fig. 5 is an elevation of the screen showing figures projected thereon. Fig. 6 is a horizontal section of an indicating mechanism wherein the value characters are placed on a transparent cone, and Fig. 7 is a similar section wherein the characters are on a transparent cylinder. Fig. 8 is a horizontal section of an indicating mechanism wherein the character bearing disk is illuminated from the front so that they may be reflected through an opening in the case. Fig. 9 is a section on the line 9—9 of Fig. 8.

Similar reference characters refer to like parts throughout the several views.

The delicacy of a computing scale may be said to vary inversely as the power required to overcome the friction of the movable parts. In a scale provided with a computing drum upon which are printed values corresponding to the indicated prices per pound, the friction of this drum and its axle is often considerable. As a portion of the load is required to overcome this friction, such scales are theoretically inaccurate, although they may be sufficiently accurate for present practical purposes.

The present invention relates to a construction wherein the indicating mechanism is so light, and so easily moved, that theoretical accuracy is very nearly approached.

In this scale, the base 1, pedestals 2, main lever 3 having rear pivots 4 and intermediate pivots 5, the check-rod 6 which connects to the cross-bar 7, the stem 8 connecting at its lower end to the check-rod and resting on the pivots 4, the platform 9, and the load resisting spring 10 connecting to the pivots 11 and to the cross-bar 12 are all of well known design and construction. A pedestal 13 extends upward from the base 1 and carries the shell or case 14.

Mounted in the case 14 so it may revolve freely, is a shaft 15 carrying a transparent disk 16 and a gear 17. A rack-bar 18 engages this gear and connects at its lower end to the lever 3. This disk 16 is of any transparent material, preferably of glass, and may be quite small, a disk two inches in diameter being usually sufficient.

The series of figures, of which a portion are indicated in Fig. 4, are printed on this disk, preferably by the photographic process, to indicate the values of the article on the scale platform, whose weight corresponds to the figures forming the outer circle on the disk. Mounted in the drum is a shutter 19 having a slot 20 through which a beam of light from the electric light or other burner 21 may pass. Lenses 22 are preferably mounted at the inner end of a tube 23 to cause the emerging rays of light to be parallel as they pass through this slot 20, and through the transparent disk 16. At the opposite end of the drum are the lenses 24 and 25, properly mounted in a tube 26.

At any desired location is a pedestal 28 of proper height which carries a frame 29 in its upper end. In this frame is mounted a screen 30 preferably of ground glass, on which are printed the characters 31 to represent the prices per pound at which the goods are to be sold. It is to be understood that these prices may vary according to the necessities of the dealer. Across this screen a line 33 may be drawn to indicate the exact location on the screen where the weights and prices should be read. In the drawings, this pedestal 28 is shown to be secured to one end of the base, but in practice, it may be placed wherever desired, and any convenient distance from and at any desired angle to the scale. It will be readily seen that by swinging the drum around the rack-bar as an axis, light may be projected in any desired direction. The construction of the lamp and lenses may be varied as desired.

The beam of light from the lamp 21 will pass through the opening 20 in the shutter 19, and through a narrow section of the disk and then by means of the lenses 24 and 25, will be projected onto the screen 30; and because of the lenses and their positions, these figures which are minute on the disk may be large on the screen so that there will be no difficulty in reading the weights and the values of the articles. The figures 31 will be properly spaced to coördinate with the figures on the disk that are projected on the screen.

If desired, the printing on the disk may be such that the body of the disk is opaque and the characters are transparent. It may readily be seen that the indicating mechanism and lenses may be so mounted as to project the characters in any desired direction, means being provided for reflecting the light in any desired manner, and the screen may be transluscent so the characters may be read from the opposite side.

The description this far has considered the member carrying the characters as a transparent, flat, circular plate. But it may be desirable to have this member of other forms, conical as in Fig. 6 or cylindrical as in Fig. 7. In Fig. 6, the case 40 has bearings 41 and 42 for the shaft 43, which shaft carries the gear 44 which meshes with a rack bar 45, and a cone 46 of some transparent material such as glass or celluloid. The light from a lamp 47, mounted in the end of a tube 48, passes through proper lenses 49, through the cone 46, through the opening 50 in the shutter 51, through the lenses 52 and 53 in the tube 54, and then to the screen as before described.

In Fig. 7, the case 60 has bearings 61 and 62 for the shaft 63, which shaft carries the gear 64 which meshes with a rack bar 65, and a disk 66, to which is secured a cylinder 67 of transparent material on which the value characters are printed. The light from a lamp 68 passes through the cylinder 67, through the slot 69 in the shutter 70, through the lenses 71 and 72 mounted in the tube 73 and then to the screen as before described. The bearing 61 may be carried by a bracket 74, and the lamp may have a reflector 75.

The device shown in Figs. 8 and 9 is constructed on the theory that reflected images may be projected on a screen. The case 80 has bearings 81 and 82 for the shaft 83, on which is mounted the gear 84 which meshes with a rack bar 85, and a disk 86 on which the characters are printed reversely. A shutter 87 is provided with a slot 88. Two lamps 89 are to be preferred, and their light is all thrown onto the disk through the slot 88 in the shutter by means of the reflectors 90. From the disk, the light is reflected and passes through the lens 92 to the screen. The reflectors 90 are preferably elliptical in horizontal cross section.

Having now explained my construction, what I claim as my invention and desire to secure by Letters Patent is:—

1. In a scale, the combination with the base, lever, load-receiver and counterbalancing means, of a case mounted on the base, said case having an opening therein, a shaft revolubly mounted therein, a transparent disk mounted on the shaft and having a series of figures thereon, arranged in concentric rings, a source of light within the case, means to project light through the disk and out through the opening in said case, means connecting said shaft and lever to cause the shaft to revolve as the load on the scale increases, a screen upon which said figures on the disk may be projected, and a shutter within the case for determining the group of figures on the disk thus projected.

2. In a scale, the combination with the base, lever, load-receiver and counterbalancing means, a case having an opening therein through which light may pass, a transparent revoluble disk within the case, said disk having figures thereon representing weights and values, means connecting the disk and the lever whereby the disk is caused to rotate in one direction when the load on the lever is increased, means to project light through the disk, a shutter within the case for determining the figures on the disk thus projected, and means for receiving said light.

3. Means for indicating weight or values consisting of a scale mechanism, a case, a movable plate of transparent material bearing figures within the case, means connected to said plate and scale mechanism whereby movement of the scale mechanism will change the position of the plate, a screen, means to project light through the plate onto the screen, and a shutter within the case for determining the figures on the plate thus projected.

4. In a scale, the combination with a base, lever, load-receiver and counterbalancing means, of a case mounted on the base, a shaft revolubly mounted therein, a disk mounted on the shaft and having figures thereon arranged in concentric rings, a source of light within the case which falls on said disk and proceeds therefrom, a lens to project said light, means to receive said light, a shutter within the case to determine the group of figures on the disk thus projected, and means to operatively connect the shaft and scale lever.

5. In a scale, the combination with a base, lever, load-receiver, and counterbalancing means, of a case mounted on the base, a shaft revolubly mounted therein, means for operatively connecting the shaft and lever, a transparent member on said shaft and having a series of graduations arranged in concentric rings, a source of light, means to project the light through the transparent member and out of the case, a screen to receive the light thus projected, and a shutter within the case for determining the graduations thus projected.

6. In a scale, the combination of a base, lever, load-receiver, and counterbalancing means, of a case mounted on the base, a shaft revolubly mounted therein, means to operatively connect said shaft and lever to cause the shaft to revolve as the load on the scale increases, a member mounted on said shaft and bearing figures arranged in rows, a source of light within the case which light falls on said member and proceeds therefrom, means for projecting said light, a screen upon which the figures may be projected, and a shutter within the case to determine the figures thus projected.

7. In a device for indicating values, the combination of a scale mechanism, a case, a movable member within the case having value characters on its surface, means connecting the movable member and the scale mechanism whereby the movable member is caused to move in one direction when the load on the scale mechanism is increased, a source of light which light falls on said member and proceeds therefrom, a screen, means for projecting said light onto the screen, and a shutter within the case for determining the characters thus projected.

8. In a scale, the combination with the base lever and load-receiver, of a case secured to the base, said case having an opening therein, a shaft revolubly mounted therein, a transparent member mounted on the shaft and having a series of figures thereon, a source of light within the case, means to project light through the transparent member and out through the opening in the case, means connecting the shaft and lever to cause the shaft to revolve as the load on the scale increases, a screen upon which said figures on the disk may be projected, and a shutter within the case for determining the figures on the disk thus projected.

9. In a scale, the combination with the base, lever and load receiver, of a case secured to the base, said case having an opening therein, a movable member therein, a transparent member movable with the movable member and having figures thereon, a source of light, means to project light through the transparent member and out through the opening in the case, means connecting the movable member and the lever to cause the movable member to move as the load on the scale increases, a screen upon which said figures on the movable member may be projected, and a shutter within the case for determining the figures on the movable member thus projected.

10. In a scale, the combination with a support, a load receiver supported thereby, a case, a movable member mounted on the support, a transparent member within the case and movable with the movable member and having figures thereon, a source of light, means to project light through the transparent member, means connecting the movable member and the load receiver to cause the movable member to move as the load on the scale increases, a screen upon which said figures on the transparent member may be projected, and a shutter within the case for determining the figures on the transparent member thus projected.

11. In a scale, the combination with a support, a load receiver supported thereby, a case, a movable member mounted on the support, a second member within the case and movable with the first movable member and having figures thereon, a source of light, means to project light onto the second movable member, means connecting the movable members and the load receiver to cause the movable members to move as the load on the scale increases, a screen upon which said figures on the second movable member may be projected, and a shutter within the case for determining the figures on the second movable member thus projected.

12. In a scale, the combination of a support, a load receiver supported thereby, a case, a revoluble shaft mounted on the support, a member within the case, said member being mounted on the shaft to move therewith and having a series of figures thereon, a source of light, means to project light onto the member on the shaft, means connecting the shaft and the load receiver to cause the shaft to rotate as the load on the scale increases, a screen upon which said figures on the member may be projected, and a shutter within the case for determining the figures on the member thus projected.

In testimony whereof I have signed this application in the presence of two subscribing witnesses.

FREMONT H. BUCKINGHAM.

Witnesses:
EDWARD N. PAGELSEN,
HUGO W. KREINBRING.